United States Patent [19]
Kim et al.

[11] Patent Number: 5,917,564
[45] Date of Patent: Jun. 29, 1999

[54] METHODS OF FORMING ACTIVE MATRIX DISPLAY DEVICES WITH REDUCED SUSCEPTIBILITY TO IMAGE-STICKING AND DEVICES FORMED THEREBY

[75] Inventors: Dong-Gyu Kim, Kyungki-do; Won-Hee Lee, Seoul, both of Rep. of Korea

[73] Assignee: Samsung Electronics Co., Ltd., Rep. of Korea

[21] Appl. No.: 08/950,334

[22] Filed: Oct. 14, 1997

[30] Foreign Application Priority Data

Nov. 13, 1996 [KR] Rep. of Korea ................. 96-53732

[51] Int. Cl.[6] ................... G02F 1/136; G02F 1/1333
[52] U.S. Cl. ................. 349/46; 349/138; 257/59; 257/72
[58] Field of Search ................. 349/141, 43, 46, 349/138; 257/59, 72

[56] References Cited

U.S. PATENT DOCUMENTS

| | | | |
|---|---|---|---|
| 5,471,330 | 11/1995 | Sarma | 349/43 |
| 5,610,737 | 3/1997 | Akiyama et al. | 349/47 |
| 5,731,856 | 3/1998 | Kim et al. | 349/43 |
| 5,734,451 | 3/1998 | Yanagawa et al. | 349/43 |
| 5,760,857 | 6/1998 | Yanagawa et al. | 349/43 |

*Primary Examiner*—Tiep H. Nguyen
*Attorney, Agent, or Firm*—Myers Bigel Sibley & Sajovec

[57] ABSTRACT

Methods of forming active matrix display devices with reduced susceptibility to image sticking include the steps of forming a gate electrode on a face of a substrate and then forming a first insulating layer on the gate electrode and on the face to electrically isolate the gate electrode from adjacent regions. A first amorphous semiconductor layer is then formed on the first insulating layer. In particular, the first amorphous semiconductor layer, which acts as the active region of the TFT, is patterned to extend opposite the gate electrode. A channel protection layer is also formed on the first amorphous semiconductor layer. The channel protection layer is designed to protect the channel portion of the active region in the first amorphous semiconductor layer from potential damage which may occur during subsequent process steps. Then, the first insulating layer and the channel protection layer are etched simultaneously until the face of the substrate is exposed. Here, the step of forming a gate electrode includes the steps of forming a first conductive layer having a thickness of about 2000 Å on the face of the substrate and then patterning the first conductive layer to define a gate electrode of a thin-film transistor and a common electrode. The first insulating layer is then formed on the gate electrode and the common electrode, but is subsequently removed from the common electrode to reduce image-sticking effects which may impair display performance in in-plane switching (IPS) TFT-LCD display devices.

23 Claims, 17 Drawing Sheets

METHODS OF FORMING ACTIVE MATRIX DISPLAY DEVICES WITH REDUCED SUSCEPTIBILITY TO IMAGE-STICKING AND DEVICES FORMED THEREBY

FIELD OF THE INVENTION

The present invention relates to methods of forming display devices and display devices formed thereby and more particularly to methods of forming liquid crystal display devices and devices formed thereby.

BACKGROUND OF THE INVENTION

Generally, twisted nematic liquid crystal displays (TN-LCDs) have been used as thin film transistor liquid crystal displays (TFT-LCDs). In TFT-LCD display devices, liquid crystals having dielectric anisotropy are injected between glass substrates and transparent electrodes are deposited on the glass substrates. The liquid crystals are aligned to twist continuously at 90 degrees against the surfaces of the upper and lower substrates. Accordingly, light, which is incident on the substrates, passes through the substrates, rotating at 90 degrees according to the twisted orientation of the liquid crystals. As will be understood by those skilled in the art, polarizers and analyzers are typically attached on the upper and the lower substrates, respectively, to use the above-mentioned twisted operation to change the amount of light transmission. However, a plane viewing angle is typically limited since the liquid crystals are twisted within a range of 90 degrees. To overcome the above-mentioned disadvantages, attempts have been made to develop in-plane switching (IPS) TFT-LCD display devices.

In the IPS TFT-LCD display devices, the maximum viewing angle is improved since a common electrode and a pixel electrode are formed on the same substrate, whereby the liquid crystals operate only in a direction which is parallel to the substrate. However, the aperture ratio is typically reduced to half since the opaque pixel electrode and the common electrode are formed side-by-side on the substrates. To compensate for the reduced aperture ratio, the brightness of the display's backlight should be strong to compensate for the reduced transmittivity. However, as will be understood by those skilled in the art, to reduce leakage currents caused by the higher light intensity, it is typically preferable to use channel protection type TFTs having thin semiconductor layers rather than channel etch type TFTs having thick semiconductor layers.

Hereinafter, the structure of a conventional channel protection type IPS TFT-LCD display device and a fabrication method therefor is explained in detail with reference to the accompanying drawings. In particular, FIG. 1 is a schematic layout diagram of a display device according to the prior art. As illustrated by FIG. 1, a plurality of gate lines 1 are formed in parallel on a substrate. A plurality of data lines 2 are also formed and these data lines 2 extend orthogonal to the gate lines 1. Pads 1' and 2' are formed at end portions of the gate and the data lines 1 and 2 and provide means for receiving a scanning signal or a pixel signal from an external driving circuit and transmitting these signals to the gate and data lines 1 and 2.

FIGS. 2A–6C illustrate a method of fabricating an IPS TFT-LCD display device according to the prior art. In particular, FIGS. 2A, 3A, 4A, 5A and 6A are layout schematic views of intermediate structures which illustrate a method of forming a TFT-LCD display device according to the prior art. FIGS. 2B, 3B, 4B, 5B and 6B are cross-sectional views of the intermediate structures of FIGS. 2A, 3A, 4A, 5A and 6A taken along line A–A' and FIGS. 2C, 3C, 4C, 5C and 6C are cross-sectional views of intermediate structures which illustrate a prior art method of forming a gate pad of a TFT-LCD display device. Referring to FIGS. 2A–2C, a metal layer such as Al, Al—Nd, Al—W or Al—Ta is deposited on a substrate 10 to a thickness of 200 nm, and patterned to form a gate electrode 11, a common electrode 15, a common electrode line 18 and a gate pad (reference number 1' in FIG. 2C). Next, a gate insulating film (reference number 12 in FIGS. 2B and 2C), an amorphous silicon layer (reference numeral 13 in FIGS. 2B and 2C) and a channel protection film (reference numeral 14 in FIGS. 2B and 2C) are successively deposited. The gate insulating film 12 is formed of a silicon nitride (SiNx) layer to a thickness of about 200–400 nm, the amorphous silicon layer 13 is formed to a thickness of less than 50 nm, and the channel protection film 14 is also formed of silicon nitride, an insulating material. The common electrode 15 is extended from the common electrode line 18, and the gate line 1 is formed in parallel to the common electrode line 18. A part of the gate line 1 is extended to form the gate electrode 11.

The next step is illustrated in FIGS. 3A–3C. The channel protection film 14, which is made of silicon nitride, is formed through a photolithography process which only leaves a pattern above the gate electrode 11 but with a width less than the width of the gate electrode 11. When etching the channel protection film 14, a chemical material having selective etching characteristics between the channel protection film 14 of silicon nitride and the amorphous silicon layer 13 is used so as not to etch the amorphous silicon layer 13. After being etched through the photolithography process, the channel protection film 14 is formed within the border of the gate electrode 11. Here, the channel protection film 14, which is formed on the gate pad (reference numeral 1' in FIG. 3C), is completely removed. After this process, the process steps illustrated in FIGS. 4A–4C are performed. Referring to FIGS. 4A–4B, the amorphous silicon layer 13 is patterned and etched. Generally, the width of the amorphous silicon layer 13 is formed wider than that of the gate electrode 11. Referring to FIG. 4A, the width of the amorphous silicon layer 13 is formed horizontally larger than that of the gate electrode 11. In this process, the amorphous silicon layer 13, which is covered on the gate pad (reference numeral 1' in FIG. 4C) is completely removed.

Referring to FIGS. 5A–5C, an $n^+$ amorphous silicon layer 16 is deposited to a thickness of about 50 nm and a metal layer such as Cr, Al or an Al alloy is deposited on the $n^+$ amorphous silicon layer 16 to a thickness of about 100–400 nm. Both layers are successively etched through the photolithography process to form a data line 2, a pad 2', source and drain electrode (S and D) and a pixel electrode (reference numeral 17 FIGS. 5A and 5B). The amorphous silicon layer 13 above the gate electrode 11 is formed wider than the gate electrode 11, and the channel protection film 14 is formed on the amorphous silicon layer 13, but is narrower than the gate electrode 11. In addition, the data line 2 is formed to cross the gate line 1 and the common electrode line 18, and a part of the source electrode S is extended from the data line 2 to overlap a side of the gate electrode 11.

One terminal of the pixel electrode 17 overlaps the other border of the gate electrode 11 to form a drain electrode D, and the rest is extended toward the common electrode line 18, in parallel with the common electrode 15. In this process, only the gate insulating film 12 is left on the gate pad 1' since the $n^+$ amorphous silicon layer 16 and the metal layer are completely removed during the step of etching the data line 2 and the pixel electrode 17 through the photolithography process.

Referring now to FIGS. 6A–6C, part of the insulating film 12 is etched from the pad 1' so that the pad 1' can be electrically connected to an external diving circuit. At least five (5) photolithography process steps are required to form the conventional TFT substrate having the above-mentioned structure. It is preferable that the number of photolithography process steps be reduced to decrease the cost and time to manufacture the TFT substrate since the photolithography equipment, photoresist and developing solution are expensive and additional process steps add to the time required to produce the TFT substrate. In addition, the alignment is performed by depositing the polyimide alignment film on the common electrode, which is under the insulating film, in the wiring of the TFT according to the conventional fabrication method. However, DC electric field components, which remain between the common electrode and the polyimide when the liquid crystal is driven by AC, are present because the polyimide film becomes ionized during operation. Accordingly, the conventional TFT is limited by a parasitic phenomenon commonly referred to as "image-sticking". Thus, notwithstanding the above described method of forming IPS TFT-LCD display devices, there continues to be a need for improved methods of forming display devices.

SUMMARY OF THE INVENTION

It is therefore an object of the present invention to provide improved methods of forming thin-film transistor (TFT) liquid-crystal display (LCD) devices and display devices formed thereby.

It is another object of the present invention to provide methods of forming TFT-LCD display devices having reduced susceptibility to image-sticking and display devices formed thereby.

These and other objects, features and advantages are provided by methods of forming TFT-LCD display devices which include the steps of forming a gate electrode on a face of a substrate (e.g., transparent substrate) and then forming a first insulating layer on the gate electrode and on the face to electrically isolate the gate electrode from adjacent regions. A first amorphous semiconductor layer (e.g., amorphous silicon (a-Si)) is then formed on the first insulating layer. In particular, the first amorphous semiconductor layer, which acts as the active region of the TFT, is patterned to extend opposite the gate electrode. A channel protection layer is also formed on the first amorphous semiconductor layer. The channel protection layer is designed to protect the channel portion of the active region in the first amorphous semiconductor layer from potential damage which may occur during subsequent process steps. Then, the first insulating layer and the channel protection layer are etched simultaneously until the face of the substrate is exposed. Here, the step of forming a gate electrode includes the steps of forming a first conductive layer (e.g., Al, Al—Nd, Al—W, Al—Ta) having a thickness of about 2000 Å on the face of the substrate and then patterning the first conductive layer to define a gate electrode of a thin-film transistor and a common electrode. The first insulating layer is then formed on the gate electrode and the common electrode, but is subsequently removed from the common electrode to reduce image-sticking effects which may impair display performance in in-plane switching (IPS) TFT-LCD display devices.

Steps are also provided to form a second amorphous semiconductor layer (e.g., N+ a-Si) as a contact layer on the first amorphous semiconductor layer and then form a second conductive layer (e.g., Cr, Mo, Al and Al-alloys) on the second amorphous semiconductor layer. The second conductive layer is also preferably patterned as a data line and a pixel electrode. During the step of patterning the second conductive layer, the channel protection layer is also exposed. The data line and pixel electrode may also be preferably used as etching masks during the above described steps of simultaneously etching the first insulating layer and the channel protection layer. In particular, a wet etching step may be performed to define the data line and the pixel electrode and then a dry etching step may be performed to etch the channel protection layer simultaneously while the first amorphous semiconductor layer and the first insulating layer are being etched. Here, the thickness of the channel protection layer is preferably selected so that it is not entirely consumed when the face of the substrate and common electrode are exposed by the removal of the first insulating layer. Thus, the portion of the first amorphous semiconductor layer to be used as the channel region of the TFT remains protected by the remaining portion of the channel protection layer, after conclusion of the etching step to remove the first insulating layer. Moreover, by using an extra-thick channel protection layer, the first insulating layer can be removed without the need for an additional photolithographically defined etching step. This reduces process cost and improves device reliability.

According to another embodiment of the present invention, TFT-LCD display devices are provided which comprise a gate electrode and common electrode on a face of a substrate (e.g., transparent substrate) and a first electrically insulating layer on the gate electrode. The first electrically insulating layer preferably has a first thickness in a range between about 2,000 and 4,000 Å. A first amorphous silicon layer is also provided on the first electrically insulating layer. The first amorphous silicon layer preferably has a second thickness of less than about 1,000 Å. To protect the first amorphous silicon layer, a channel protection layer having a third thickness greater than the sum of the first thickness and the second thickness, is provided on the first amorphous silicon layer, opposite the gate electrode. By making the channel protection layer relatively thick compared to the first insulating layer and the first amorphous silicon layer, the amorphous silicon active region of the TFT can be protected, even if the channel protection layer is etched simultaneously with steps to etch the first amorphous silicon layer and the first insulating layer to expose the face of the substrate. The channel protection layer is also preferably patterned to have first and second opposing ends which are wider than the gate electrode and an intermediate portion which is narrower than the gate electrode. A pixel electrode and data line are also provided in electrical contact with opposing ends of the first amorphous silicon layer.

DESCRIPTION OF PREFERRED EMBODIMENTS

Figure 1:
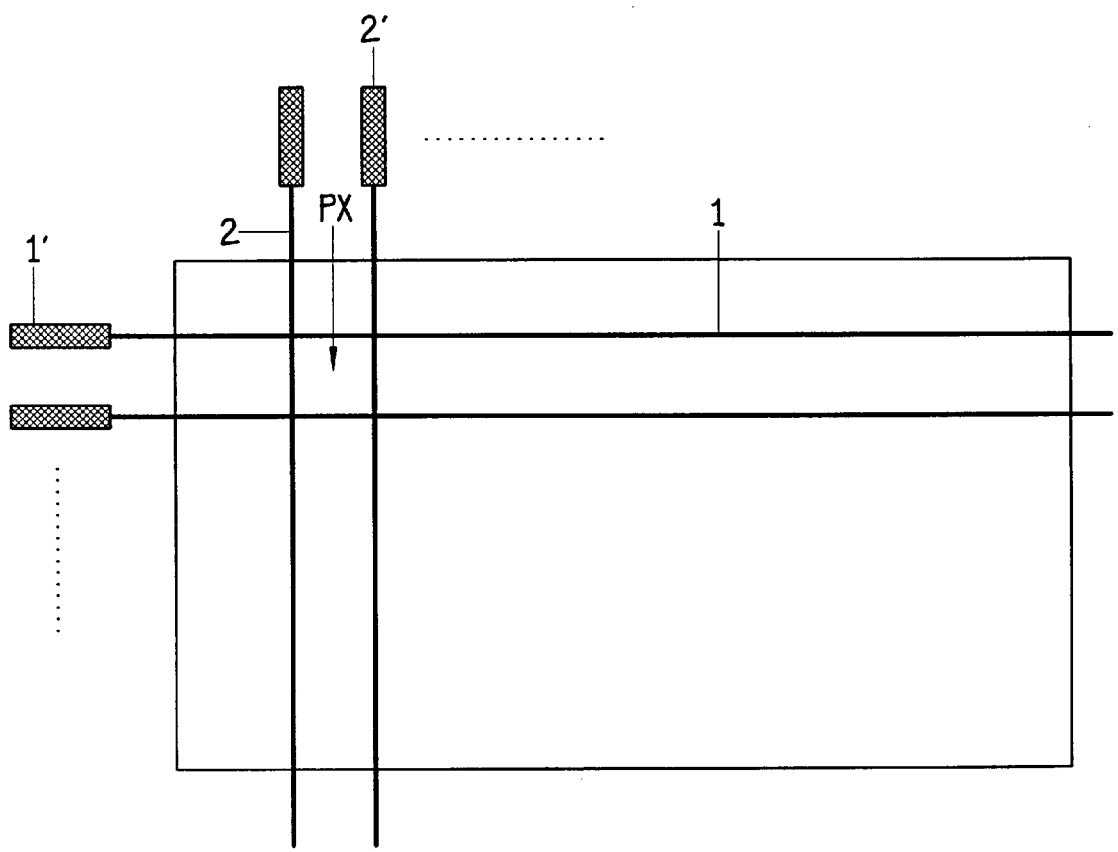
FIG. 1 is schematic layout diagram of a display device according to the prior art.
Figure 2A:
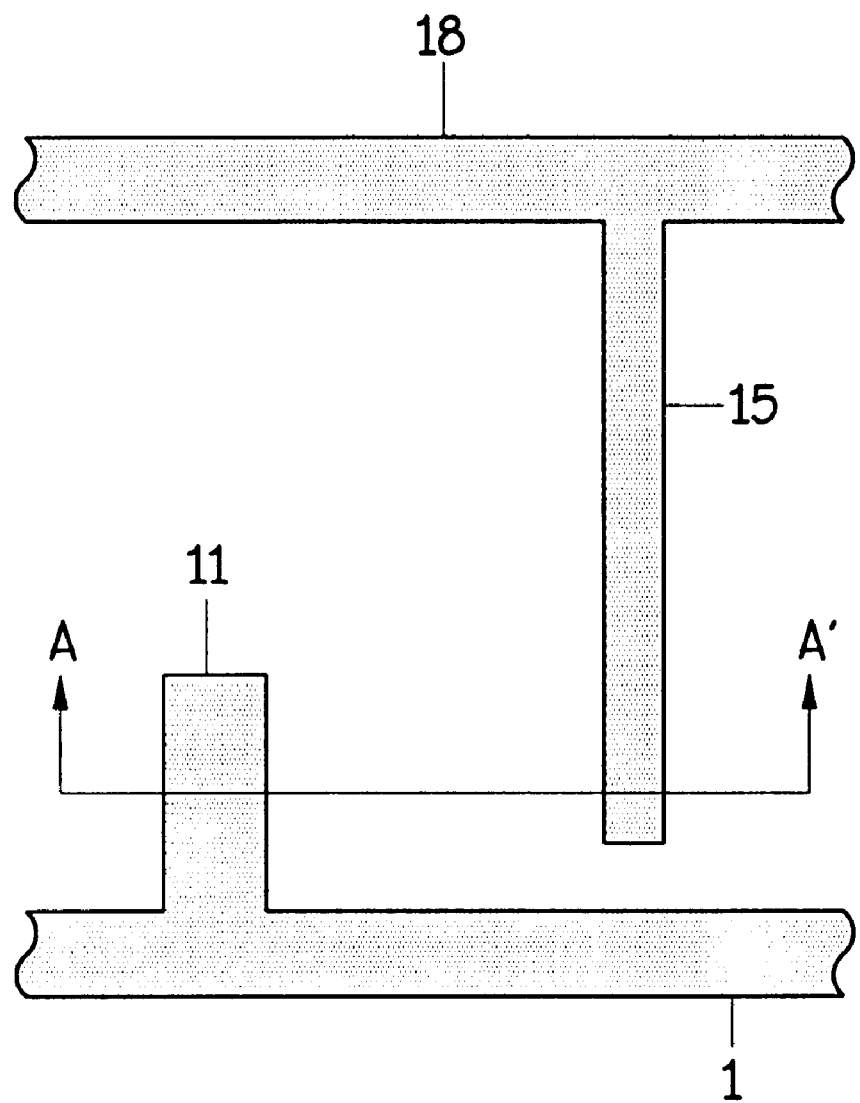
FIGS. 2A, 3A, 4A, 5A and 6A are layout schematic views of intermediate structures which illustrate a method of forming a TFT-LCD display device, according to the prior art.
Figure 2B:
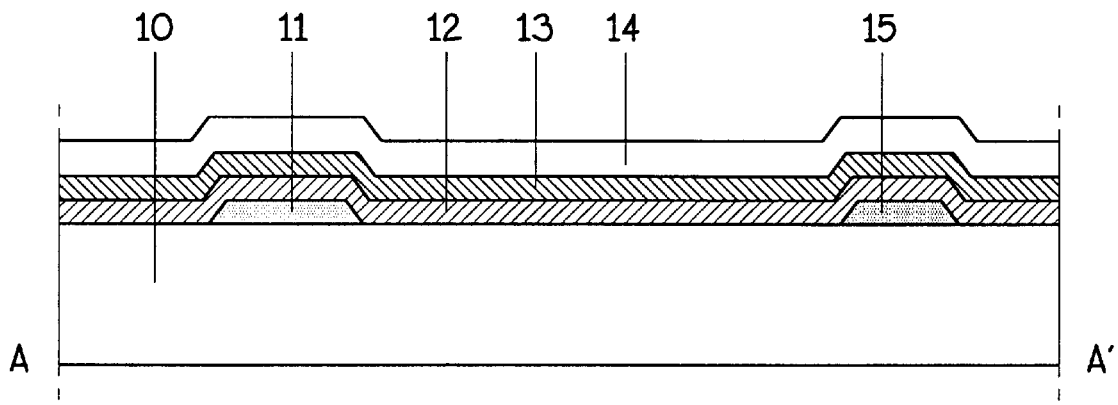
FIGS. 2B, 3B, 4B, 5B and 6B are cross-sectional views of the intermediate structures of FIGS. 2A, 3A, 4A, 5A and 6A taken along line A–A', which illustrate a method of forming a TFT-LCD display device, according to the prior art.
Figure 2C:
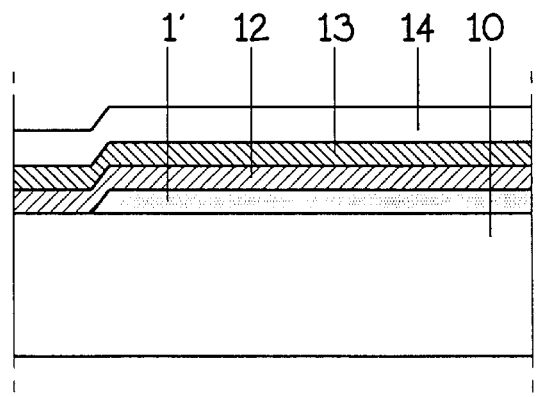
FIGS. 2C, 3C, 4C, 5C and 6C are cross-sectional views of intermediate structures which illustrate a method of forming a gate pad of a TFT-LCD display device, according to the prior art.
Figure 3A:
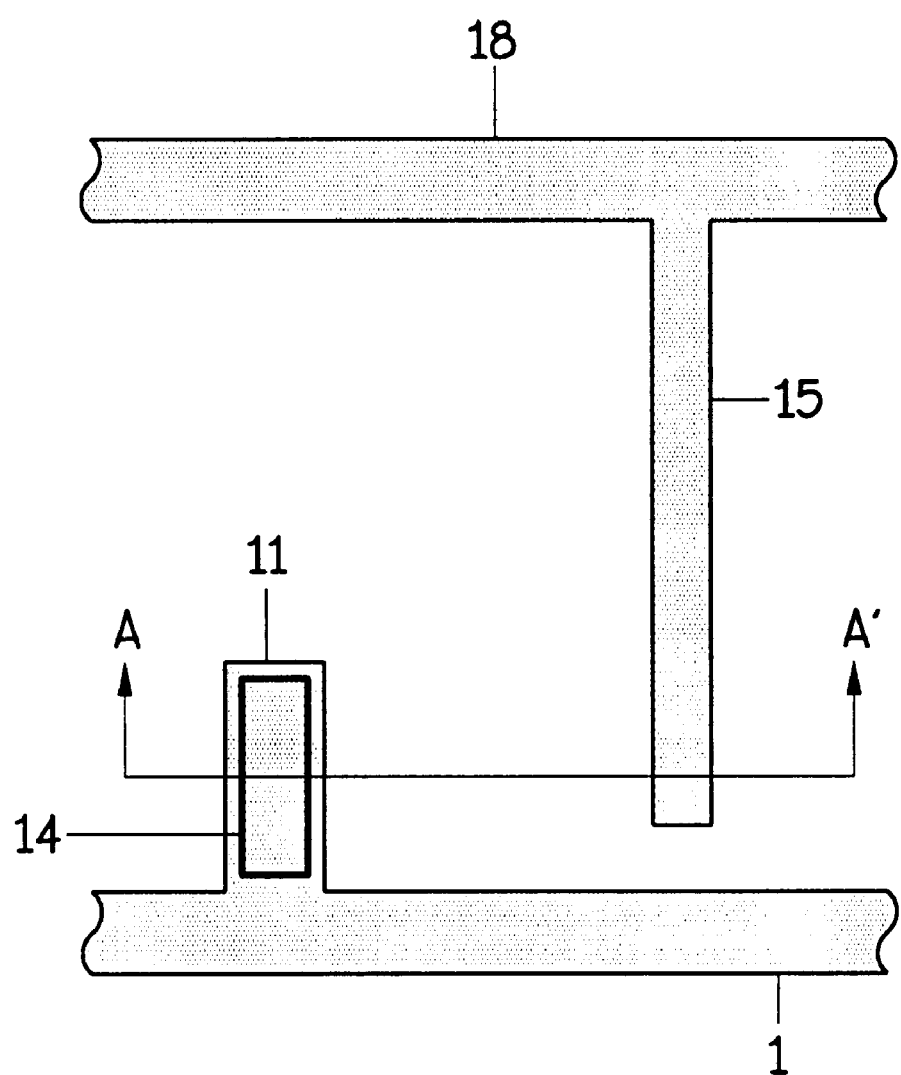
Figure 3B:
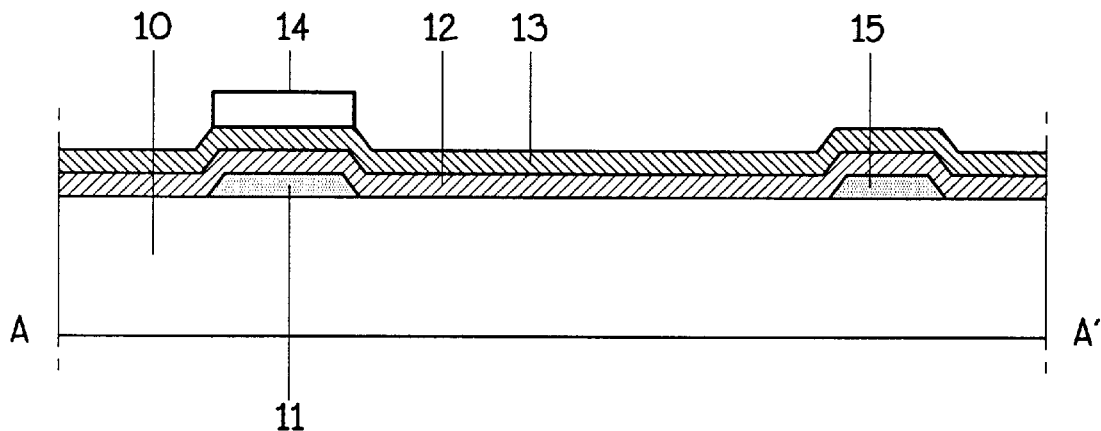
Figure 3C:
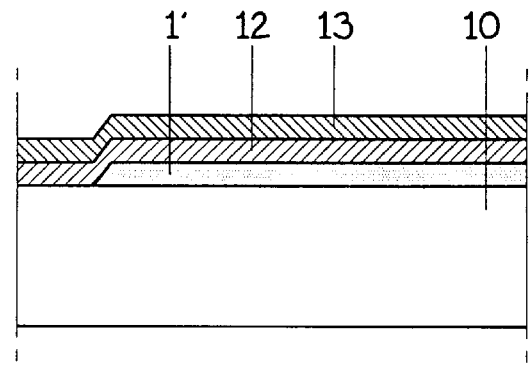
Figure 4A:
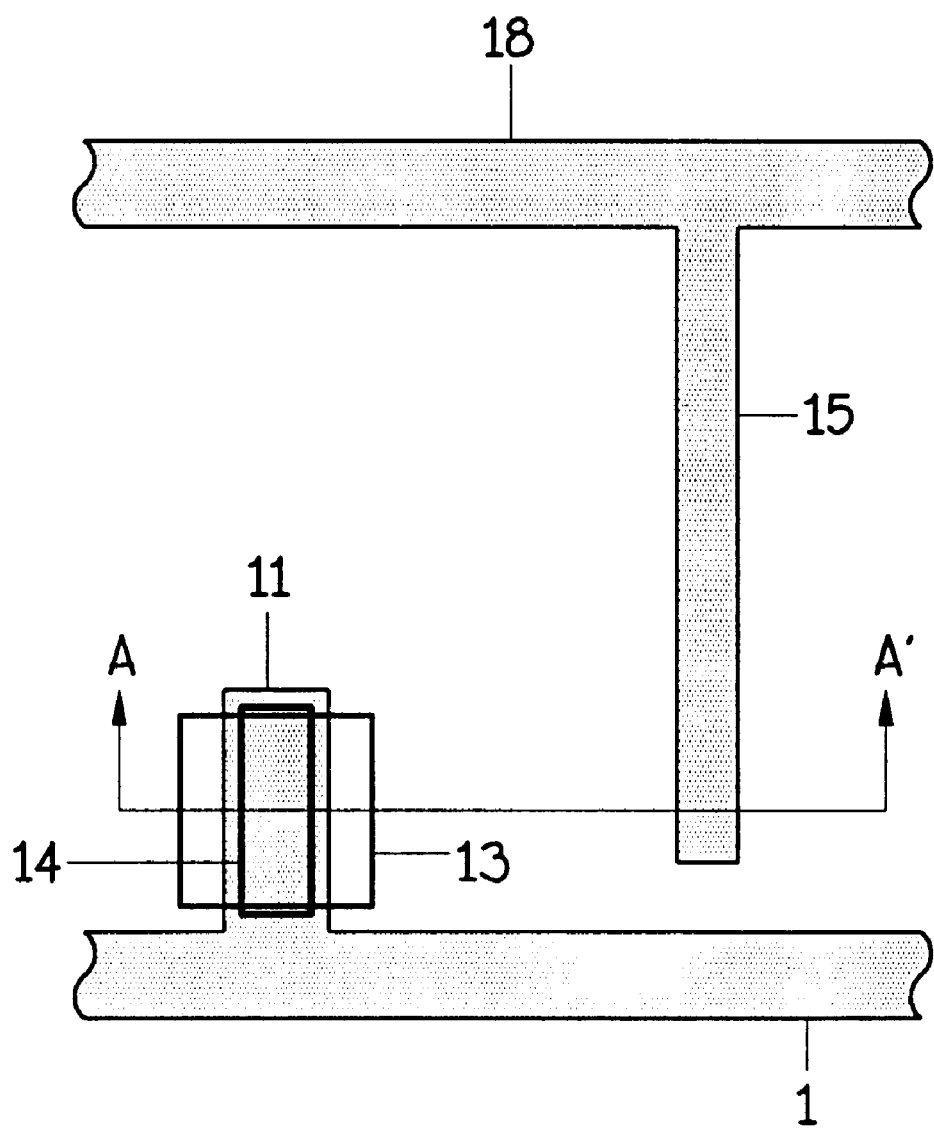
Figure 4B:
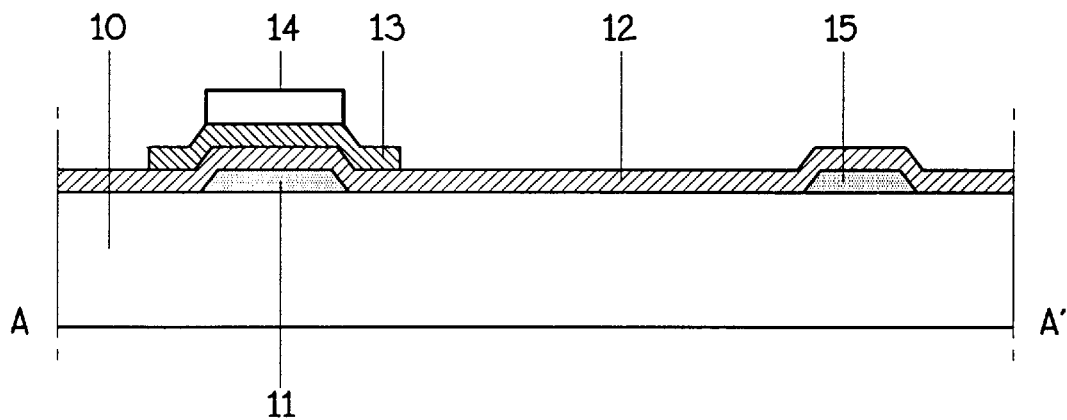
Figure 4C:
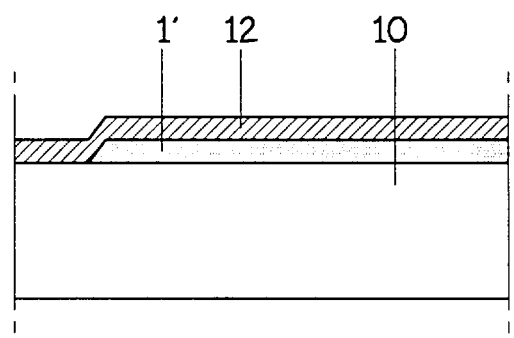
Figure 5A:
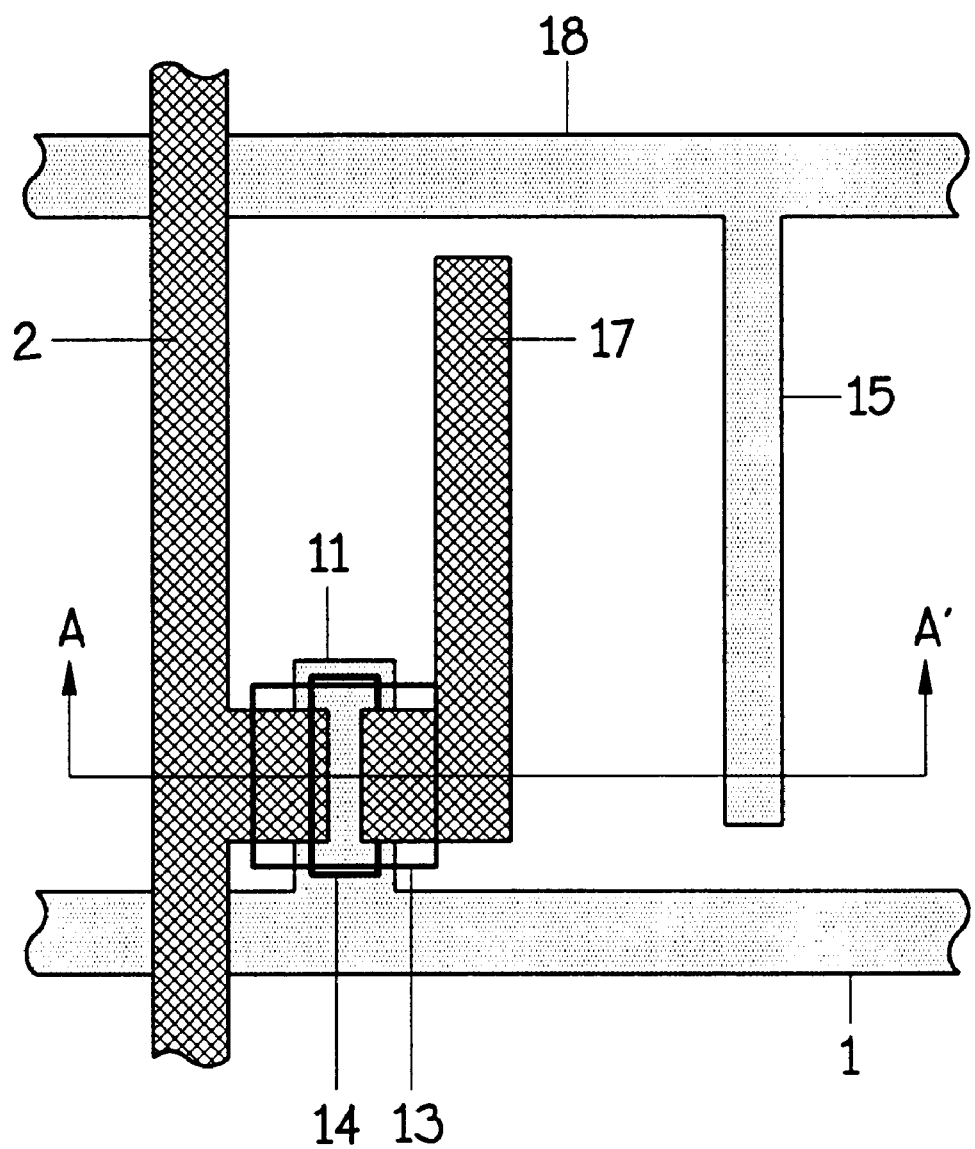
Figure 5B:
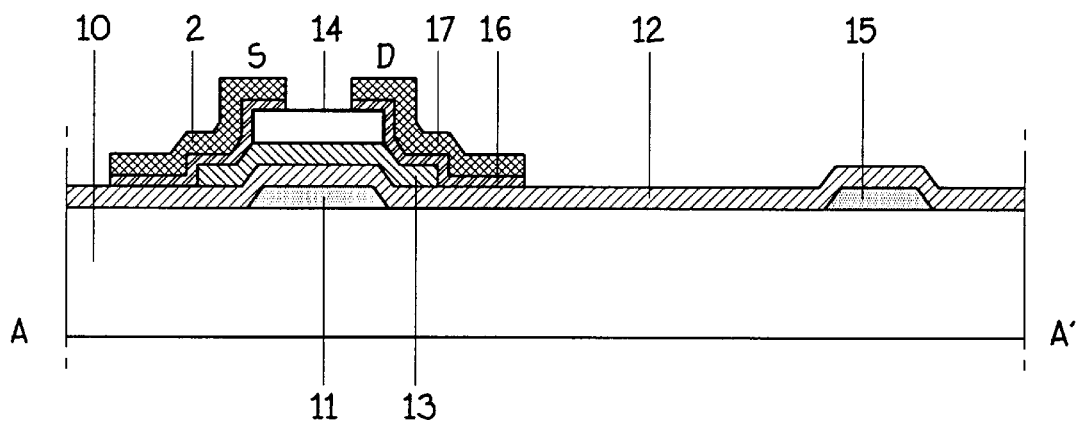
Figure 5C:
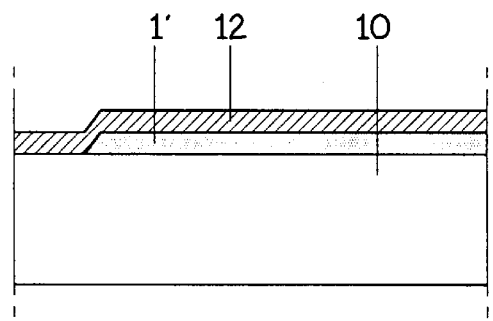
Figure 6A:
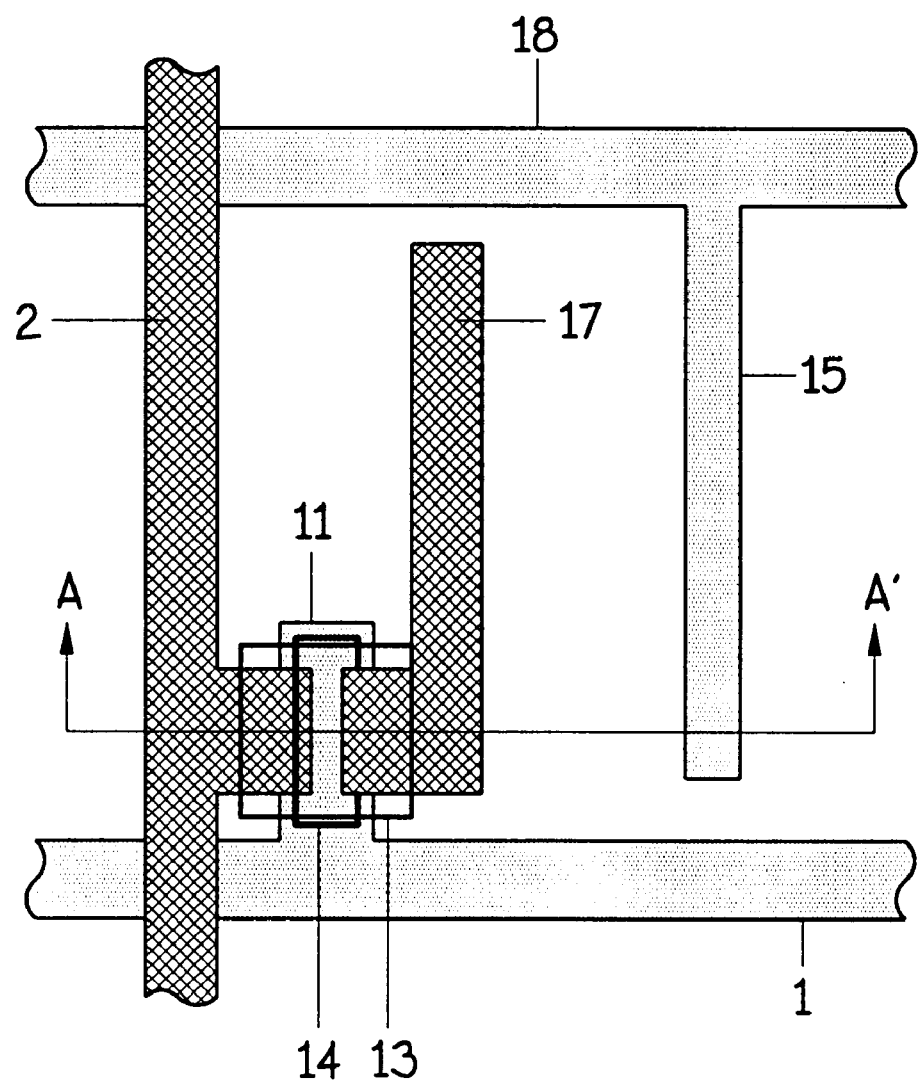
Figure 6B:
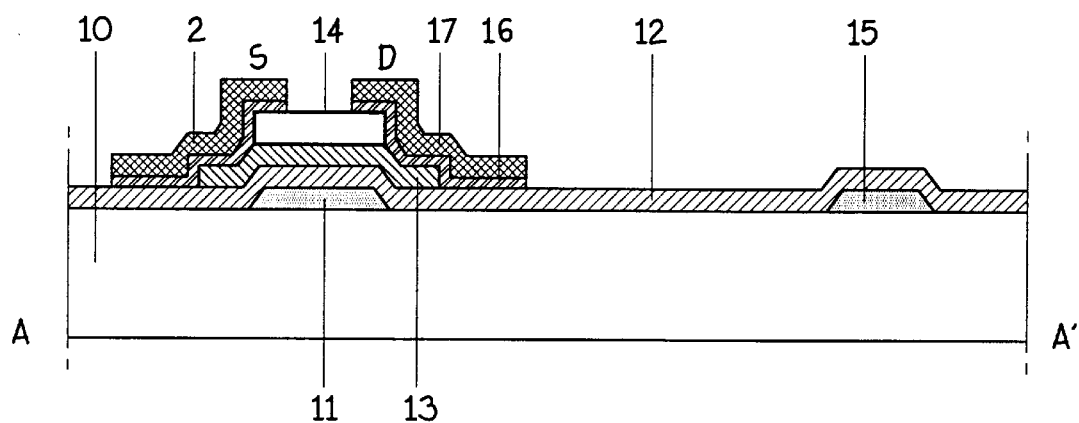
Figure 6C:
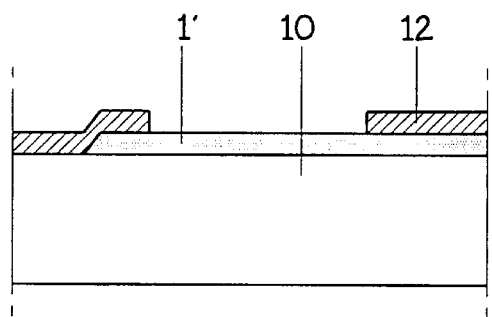

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to elements of similar material throughout.

Figure 7A:
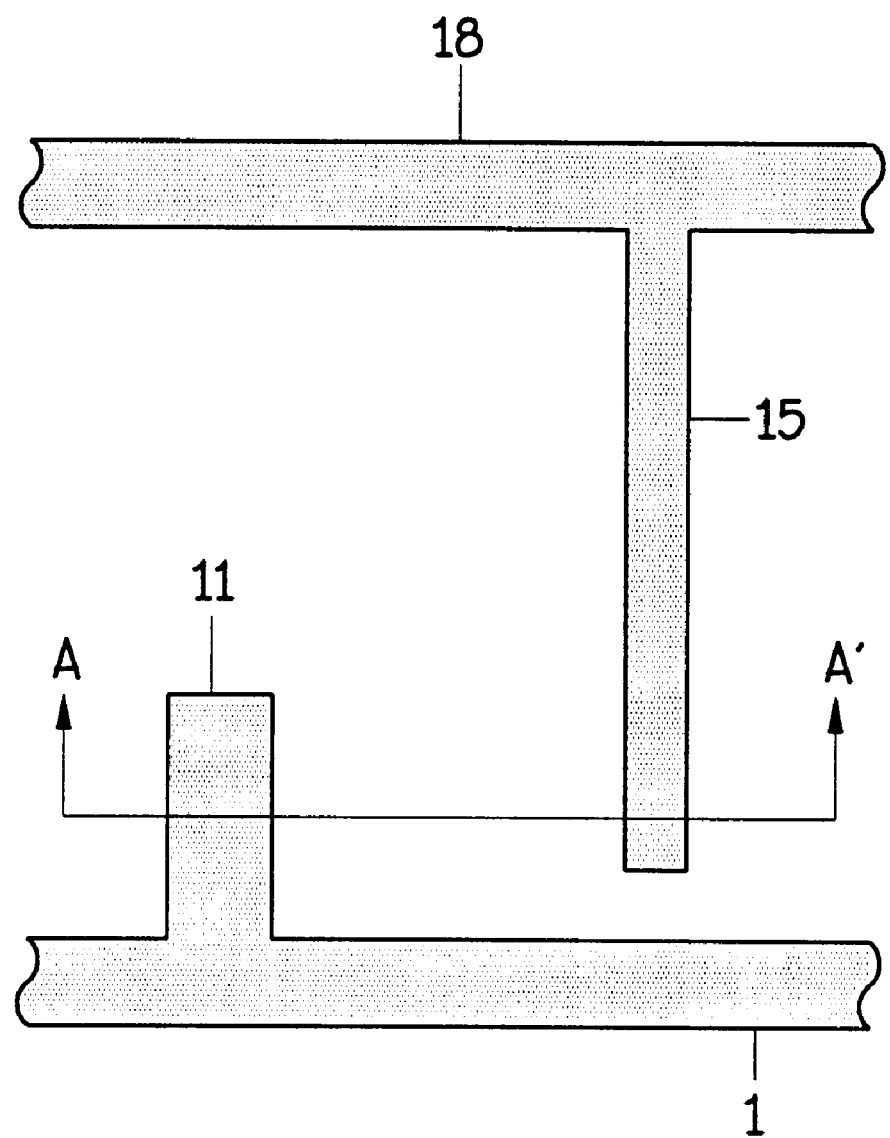
FIGS. 7A, 8A and 9A are layout schematic views of intermediate structures which illustrate a method of forming a TFT-LCD display device, according to the present invention.

Preferred methods of forming display devices, including in-plane switching (IPS) TFT-LCD display devices, will now be described. In particular, as illustrated best by FIGS. 7A–7C, a first conductive layer is deposited on a substrate 10 (e.g., transparent substrate) to a thickness of about 2000 Å. The first conductive layer may comprise a metal selected from the group consisting of Al, Al—Nd, Al—W or Al—Ta. The first conductive layer is then photolithographically patterned to define a gate line 1, having a plurality of gate electrodes 11 extending therefrom, and a common electrode line 18 having a plurality of common electrodes 15 extending therefrom. As illustrated best by FIG. 7A, the common electrode line 18 is formed in parallel with a gate line 1 and the common electrodes 15 extend parallel to the gate electrodes 11. Electrical contact to the gate line 1 may be made via a gate pad 1'.

Figure 7B:
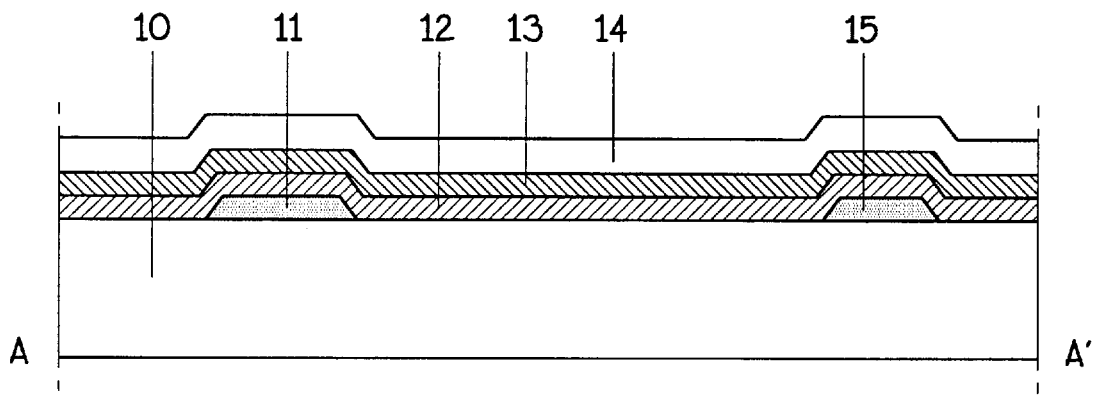
FIGS. 7B, 8B and 9B are cross-sectional views of the intermediate structures of FIGS. 7A, 8A and 9A taken along line A–A', which illustrate a method of forming a TFT-LCD display device, according to the present invention.
Figure 7C:
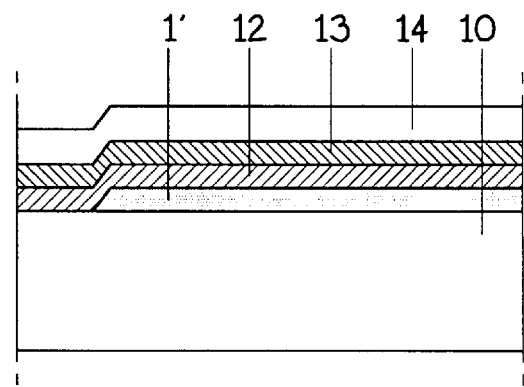
FIGS. 7C, 8C and 9C are cross-sectional views of intermediate structures which illustrate a method of forming a gate pad of a TFT-LCD display device, according to the present invention.

Referring now to FIGS. 7B–7C, a blanket first electrically insulating layer 12 is then formed on the gate line 1, gate electrodes 11, common electrode line 18 and common electrodes 15. The first insulating layer 12 may be deposited as a blanket layer of silicon nitride having a thickness in a range between about 2,000 and 4,000 Å. A first amorphous semiconductor layer 13 (e.g., a-Si) and a second insulating layer 14 are then deposited, in sequence, on the first insulating layer 12. The first amorphous semiconductor layer 13 may comprise a relatively thin undoped amorphous silicon layer having a thickness of less than about 1,000 Å, and more preferably only about 500 Å to inhibit excessive light induced leakage currents. The second insulating layer 14 may also preferably comprise a layer of silicon nitride having a thickness greater than about 5,000 Å, and more preferably about 6,000 Å. Here, the thickness of the second insulating layer 14 is greater than the sum of the thickness of the first insulating layer 12 and the first amorphous semiconductor layer 13. Moreover, to improve the selectivity of etching the second insulating layer 14, the first insulating layer 12 is deposited as a layer of silicon nitride at a temperature of greater than about 300° C., and the second insulating layer 14 is deposited as a layer of silicon nitride at a temperature less than about 250° C.

Figure 8A:
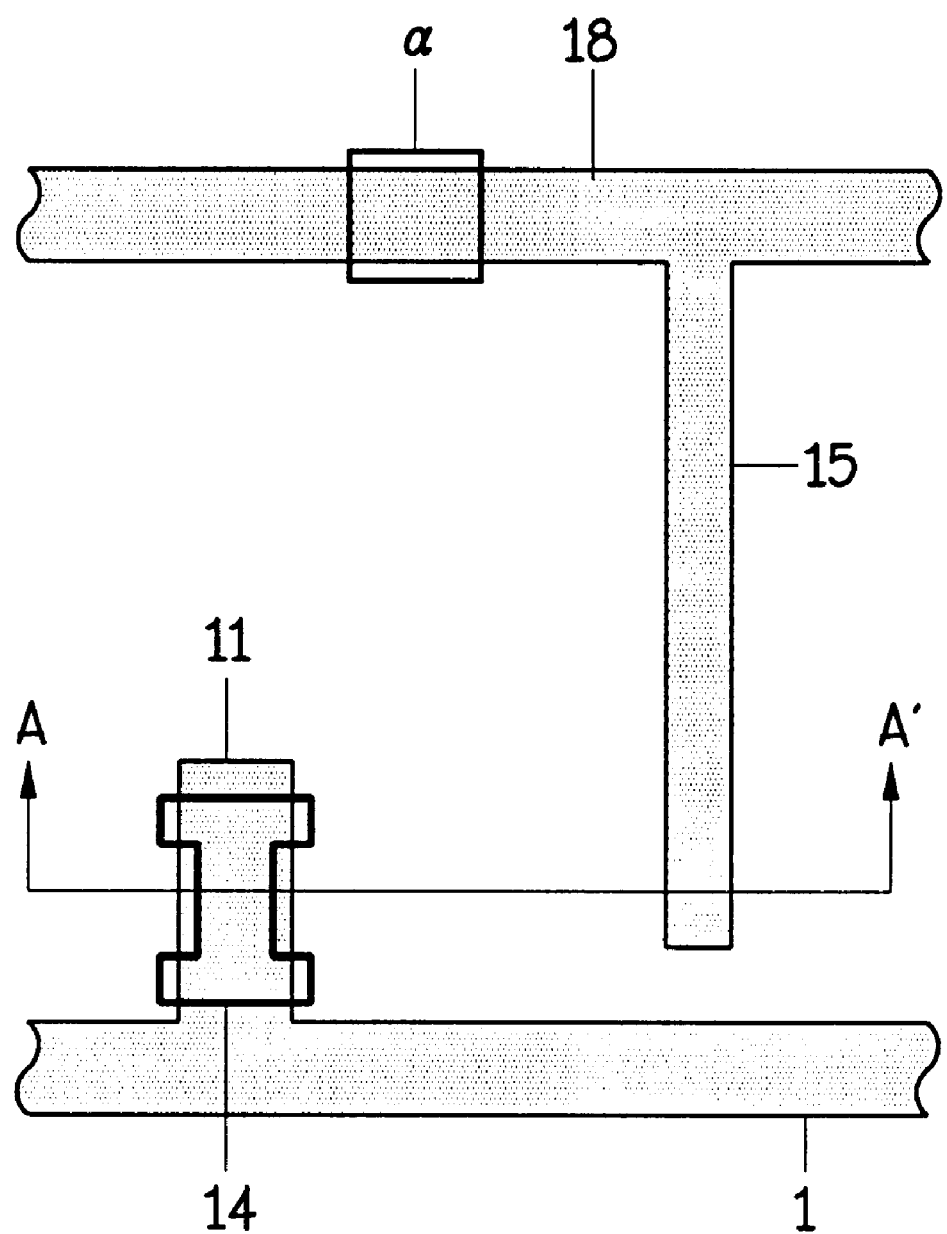
Figure 8B:
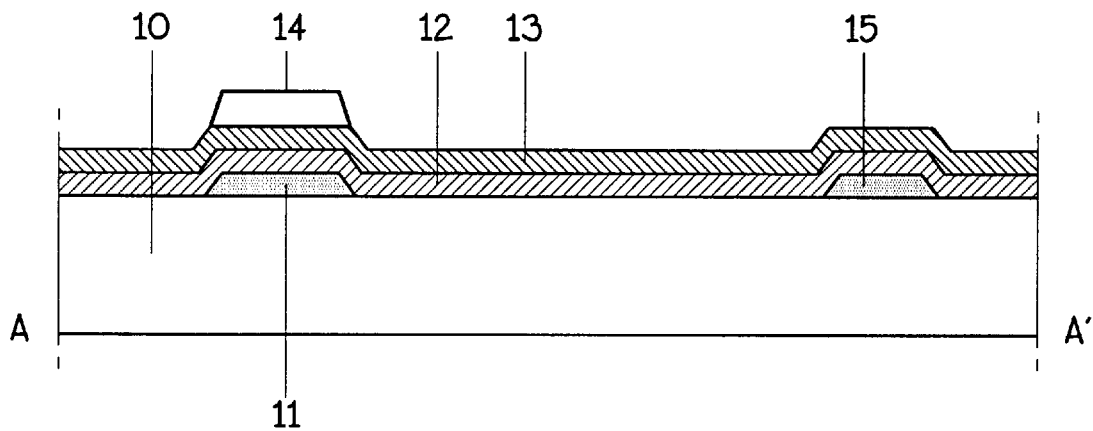
Figure 8C:
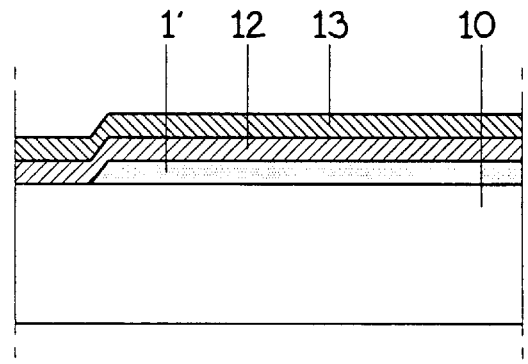

Referring now to FIGS. 8A–8C, a mask (not shown) is then photolithographically defined using conventional techniques and then a selective etching step is performed to pattern the second insulating layer 14 as a channel protection layer 14 which extends opposite the gate electrode 11, as illustrated best by FIG. 8B. This selective etching step is preferably performed using a chemical etchant which will not etch or damage the first amorphous semiconductor layer 13. As will be understood by those skilled in the art, the channel protection layer 14 also extends opposite an active region within the first amorphous semiconductor layer 13, which is typically referred to as the "channel region". A portion of the second insulating layer 14 is also etched to define a dielectric region "a" of a storage capacitor ($C_s$) which capacitively couples a pixel electrode, described hereinbelow, to a common electrode line 18. As illustrated best by FIG. 8A, the channel protection layer 14 is preferably patterned in the shape of a "dumbbell" so that first and second opposing ends of the channel protection layer 14 are wider than the gate electrode 11 and the intermediate portion of the channel protection layer 14 is narrower. As determined by the inventors herein, the use of a channel protection layer 14 having wider ends reduces the likelihood that electrical shorts will be formed between the source (S) and drain (D) electrodes (illustrated best by FIG. 9B) and the gate electrode 11.

Figure 9A:
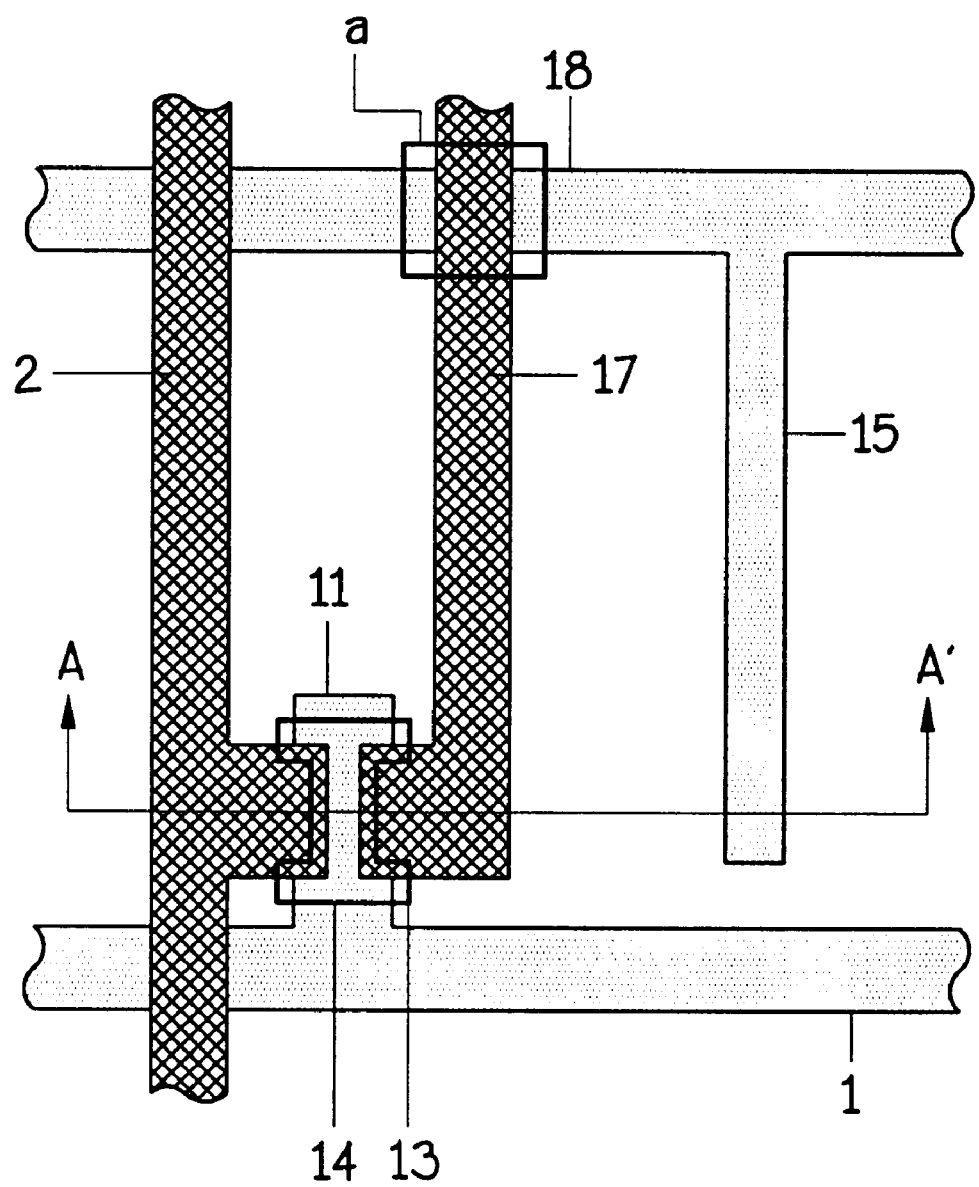
Figure 9B:
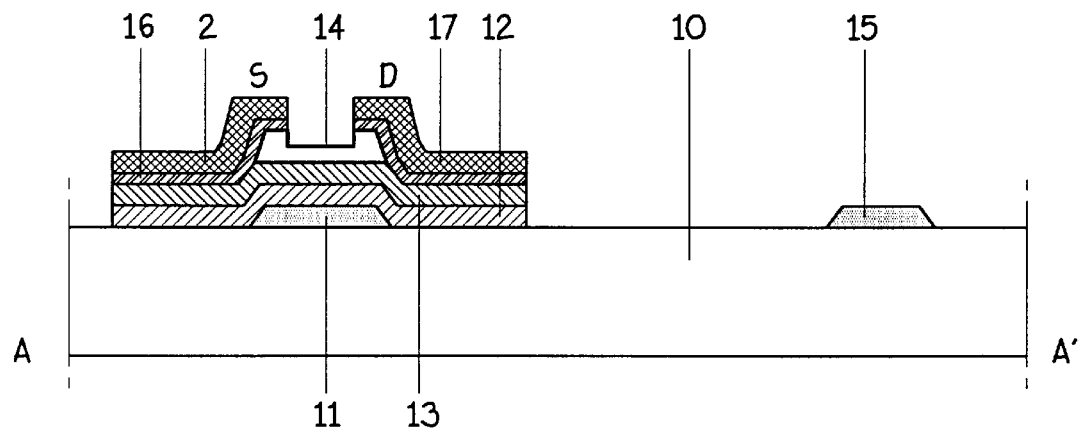
Figure 9C:
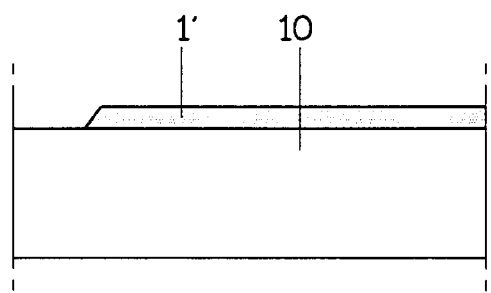

Referring now to FIGS. 9A–9C, a relatively highly doped second amorphous semiconductor layer 16 (e.g., N+ a-Si) having a thickness of about 500 Å is then formed on the first amorphous silicon layer 13. Next, a second conductive layer having a thickness in a range between about 1000 and 4000 Å is formed on the second amorphous semiconductor layer 16. The second conductive layer may comprise a layer of metal selected from the group consisting of Cr, Mo, Al and aluminum alloys. As will be understood by those skilled in the art, the relatively highly doped amorphous semiconductor layer 16 provides a low resistance intermediate contact between the first amorphous semiconductor layer 13 and the second conductive layer. Using another mask (not shown), the second conductive layer is then patterned as a data line 2 to a data pad 2' and as a pixel electrode 17. The second conductive layer may be dry or wet etched. Next, the second amorphous semiconductor layer 16, the first amorphous semiconductor layer 13 and the first insulating layer 12 are etched to expose the face of the substrate 10 and an upper surface of the common electrode line 18 and common electrodes 15, using the patterned second conductive layer as a dry etchant mask. In the event the second conductive layer is patterned using a mask and a dry etching technique, that same mask may also be used during the step of etching the second amorphous semiconductor layer 16, the first amorphous semiconductor layer 13 and the first insulating layer 12. Accordingly, after patterning, these layers have the same outline as the patterned second conductive layer.

During these etching steps, the channel protection layer 14 is also etched, however, the channel protection layer 14 is preferably made of sufficient thickness so that the face of the substrate 10 and the upper surface of the common electrode 15 are exposed before the entire thickness of the channel protection layer 14 is consumed. Thus, the thickness of the channel protection layer 14 is dependent on the etching characteristics of the first amorphous semiconductor layer 13 and the first insulating layer 12. For example, if the etching characteristics of the first amorphous semiconductor layer 13 and the first insulating layer 12 are the same and the first and second insulating layers are both made of the same material, then the thickness of the channel protection layer 14 should be greater than the combined thicknesses of the first amorphous semiconductor layer 13 and the first insulating layer 12.

When formed in accordance with the above described methods which include the complete removal of the first insulating layer 12 and the exposure of the common electrode and common electrode line during processing, the display devices of the present invention have reduced susceptibility to image-sticking. This is because the DC field components which are typically established between the common electrode and the alignment film during display operation, are eliminated even though the polyimide alignment film (not shown) is initially deposited on the common electrode 15 before the first insulating layer 12 is formed and even though the liquid crystal is driven by an AC signal source.

Moreover, the advantages of the methods of the present invention include simplification of the process by etching the pixel electrode, the metal layer for forming the data line, and the insulating film at the same time. In addition, the light-induced leakage currents caused by the strong backlight needed for in-plane switching devices, can be reduced by forming the amorphous semiconductor layer to a thickness of less 500 Å.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of forming a display device, comprising the steps of:

forming a gate electrode on a face of a substrate;

forming a first insulating layer on the gate electrode and on the face;

forming a first amorphous semiconductor layer on the first insulating layer, opposite the gate electrode;

forming a channel protection layer on the first amorphous semiconductor layer, opposite the gate electrode; and etching the first insulating layer to expose the face of the substrate while simultaneously etching a portion of the channel protection layer extending opposite the gate electrode.

2. The method of claim 1, wherein said step of forming a gate electrode comprises the steps of:

forming a first conductive layer on the face of the substrate;

patterning the first conductive layer to define a gate electrode and a common electrode;

wherein said step of forming a first insulating layer comprises forming a first insulating layer on the gate electrode and on the common electrode; and wherein said step of simultaneously etching the first insulating layer and a portion of the channel protection layer comprises etching the first insulating layer to expose the common electrode.

3. The method of claim 2, wherein said step of forming a channel protection layer is followed by the steps of:

forming a second amorphous semiconductor layer on the first amorphous semiconductor layer; and forming a second conductive layer on the second amorphous semiconductor layer.

4. The method of claim 3, further comprising the steps of patterning the second conductive layer to define a pixel electrode and a data line.

5. The method of claim 4, wherein said step of simultaneously etching the first insulating layer and a portion of the channel protection layer comprises etching the second amorphous semiconductor layer, the first amorphous semiconductor layer and the first insulating layer to expose the face of the substrate.

6. The method of claim 5, wherein said step of forming a second amorphous semiconductor layer comprises forming a second amorphous semiconductor layer on the channel protection layer; and wherein, said step of simultaneously etching the first insulating layer and a portion of the channel protection layer comprises etching the second amorphous semiconductor layer to define source and drain contact regions, using the pixel electrode and the data line as an etching mask.

7. The method of claim 6, wherein said step of simultaneously etching the first insulating layer and a portion of the channel protection layer comprises etching the channel protection layer using the pixel electrode and data line as an etching mask.

8. The method of claim 7, wherein said step of forming a first insulating layer comprises forming a first insulating layer of a first material having a thickness in a range between about 2,000 and 4,000 Å; and wherein said step of forming a channel protection layer comprises forming a channel protection layer of the first material having a thickness greater than about 4,000 Å.

9. The method of claim 8, wherein said step of forming a first insulating layer comprises depositing a first layer of silicon nitride at a temperature greater than about 300° C.; and wherein said step of forming a channel protection layer comprises depositing a second layer of silicon nitride at a temperature less than about 250° C.

10. The method of claim 9, wherein said step of patterning the second conductive layer comprises patterning the second conductive layer to define a pixel electrode which overlaps the common electrode.

11. The method of claim 10, wherein said step of forming a channel protection layer comprises forming a dielectric region of a storage capacitor on the common electrode.

12. The method of claim 8, wherein said step of forming a first amorphous semiconductor layer comprises forming a first amorphous semiconductor layer having a thickness less than about 1,000 Å; and wherein the channel protection layer has a thickness greater than the sum of the thicknesses of the first insulating layer and the first amorphous semiconductor layer.

13. The method of claim 4, wherein said step of patterning the second conductive layer comprises wet etching the second conductive layer; and wherein said step of simultaneously etching the first insulating layer and a portion of the channel protection layer comprises wet etching the second amorphous semiconductor layer, the first amorphous semiconductor layer and the first insulating layer to expose the face of the substrate, using the pixel electrode as an etching mask.

14. The method of claim 2, wherein said step of patterning the first conductive layer comprises patterning the first conductive layer to define a gate electrode having a first width; and wherein said step of forming a channel protection layer comprises forming a channel protection layer having a first region therein with a second width less than the first width and a second region therein with a third width greater than the first width.

15. A thin-film transistor display device, comprising:
a gate electrode on a face of a substrate;
a first electrically insulating layer having a first thickness, on the gate electrode;
a first amorphous silicon layer having a second thickness, on the first electrically insulating layer, opposite the gate electrode;
a channel protection layer having a third thickness greater than the sum of the first thickness and second thickness, on the first amorphous silicon layer;
a pixel electrode electrically coupled to a first end of the first amorphous silicon layer; and
a data line electrically coupled to a second end of the first amorphous silicon layer.

16. The display device of claim 15, wherein said gate electrode has a first width; and wherein first and second opposing ends of said channel protection layer have a second width greater than the first width.

17. The display device of claim 16, wherein a portion of said channel protection layer extending intermediate the first and second opposing ends thereof, has a third width less than the first width.

18. The display device of claim 15, further comprising a common electrode line on the face of the substrate; and wherein a portion of said common electrode line extends between said pixel electrode and the face.

19. The display device of claim 17,
wherein said first electrically insulating layer comprises silicon nitride and has a thickness in a range between about 2,000 and 4,000 Å;
wherein said first amorphous silicon layer has a thickness of less than about 1,000 Å; and
wherein said channel protection layer comprises silicon nitride and has a thickness greater than about 5,000 Å.

20. The display device of claim 18,
wherein said first electrically insulating layer comprises silicon nitride and has a thickness in a range between about 2,000 and 4,000 Å;
wherein said first amorphous silicon layer has a thickness of less than about 1,000 Å; and
wherein said channel protection layer comprises silicon nitride and has a thickness greater than about 5,000 Å.

21. A method of forming display device, comprising the steps of:
forming a first conductive layer on a face of a substrate;
etching the first conductive layer to define a gate electrode and a common electrode;
forming a first insulating layer on the gate electrode, on the common electrode and on the face;
forming a first amorphous semiconductor layer on the first insulating layer, opposite the gate electrode;
forming a channel protection layer on the first amorphous semiconductor layer, opposite the gate electrode;
forming a second amorphous semiconductor layer on the channel protection layer;
forming a second conductive layer on the second amorphous semiconductor layer; and
etching the second conductive layer, the second amorphous semiconductor layer, the first amorphous semiconductor layer and the first insulating layer to define a source electrode, a drain electrode and a pixel electrode;
wherein a thickness of the channel protection layer is greater than a sum of the thicknesses of the first insulating layer and the first amorphous semiconductor layer.

22. The method of claim 21, wherein the thickness of the first insulating layer is in a range between about 2000 Å and 4000 Å; and wherein a thickness of the first amorphous semiconductor layer is less than about 1000 Å.

23. The method of claim 22, wherein the second amorphous semiconductor layer comprises a doped amorphous silicon layer.

* * * * *